United States Patent
Mahalingam et al.

(10) Patent No.: US 11,333,538 B2
(45) Date of Patent: May 17, 2022

(54) SYSTEMS AND METHODS FOR FLUID FLOW MEASUREMENT WITH MASS FLOW AND ELECTRICAL PERMITTIVITY SENSORS

(71) Applicant: Saudi Arabian Oil Company, Dhahran (SA)

(72) Inventors: Sakethraman Mahalingam, Aberdeen (GB); Muhammad Arsalan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 217 days.

(21) Appl. No.: 16/855,147

(22) Filed: Apr. 22, 2020

(65) Prior Publication Data
US 2021/0333136 A1    Oct. 28, 2021

(51) Int. Cl.
| | |
|---|---|
| G01F 1/84 | (2006.01) |
| G01F 1/58 | (2006.01) |
| G01F 1/60 | (2006.01) |
| G01F 1/64 | (2006.01) |
| G01N 9/00 | (2006.01) |

(52) U.S. Cl.
CPC ............... *G01F 1/84* (2013.01); *G01F 1/584* (2013.01); *G01F 1/586* (2013.01); *G01F 1/60* (2013.01); *G01F 1/64* (2013.01); *G01N 9/002* (2013.01); *G01N 2009/006* (2013.01)

(58) Field of Classification Search
None
See application file for complete search history.

(56) References Cited

U.S. PATENT DOCUMENTS

| | | | |
|---|---|---|---|
| 3,080,750 A | | 3/1963 | Wiley et al. |
| 4,507,975 A | * | 4/1985 | Bittner ............... G01F 1/588 73/861.12 |
| 4,984,472 A | | 1/1991 | Dahlin |

(Continued)

FOREIGN PATENT DOCUMENTS

| | | |
|---|---|---|
| DE | 10 2007 062908 A1 | 6/2009 |
| DE | 10 2015 122542 A1 | 6/2017 |

(Continued)

OTHER PUBLICATIONS

International Search Report for PCT/IB2020/057116, 4 pages (dated Jan. 20, 2021).

(Continued)

*Primary Examiner* — Harshad R Patel
(74) *Attorney, Agent, or Firm* — Choate, Hall & Stewart LLP; Charles E. Lyon; Peter A. Flynn

(57) ABSTRACT

An example system is configured for determining properties of a fluid in a conduit. The system includes a mass flow meter including a hollow conduit having an inlet, an outlet, and a wall. The conduit is for conducting the fluid. The system includes a driver coupled to the conduit. The driver is configured for inducing an oscillation in the conduit. The system includes two or more accelerometers coupled to the conduit. The two or more accelerometers are configured for measuring displacement of the conduit. The system includes an electrical permittivity sensor coupled to the conduit. The electrical permittivity sensor is configured for measuring electrical permittivity of the fluid.

16 Claims, 2 Drawing Sheets

(56) References Cited

U.S. PATENT DOCUMENTS

| | | | |
|---|---|---|---|
| 5,321,991 A | 6/1994 | Kalotay | |
| 5,365,794 A | 11/1994 | Hussain et al. | |
| 5,602,344 A * | 2/1997 | Lew | G01F 1/8413 73/861.356 |
| 6,041,665 A | 3/2000 | Hussain | |
| 6,526,839 B1 * | 3/2003 | Barger | G01F 1/8404 73/861.356 |
| 6,782,150 B2 | 8/2004 | Davis et al. | |
| 6,807,866 B2 | 10/2004 | Drahm et al. | |
| 7,117,751 B2 | 10/2006 | Berger et al. | |
| 7,380,438 B2 * | 6/2008 | Gysling | G01N 22/00 702/24 |
| 7,523,005 B2 | 4/2009 | Bartstra | |
| 7,523,647 B2 | 4/2009 | Scott | |
| 9,250,109 B2 | 2/2016 | Luo | |
| 9,995,666 B2 | 6/2018 | Goodbread | |
| 10,113,994 B2 | 10/2018 | Lubrano et al. | |
| 10,119,851 B2 | 11/2018 | Ruetten et al. | |
| 2002/0194908 A1 * | 12/2002 | Sparks | G01F 1/8445 73/204.26 |
| 2008/0034890 A1 * | 2/2008 | Barua | G01F 15/024 73/861.354 |
| 2014/0224006 A1 | 8/2014 | Scott | |
| 2018/0364083 A1 | 12/2018 | Janssens | |
| 2021/0003491 A1 | 1/2021 | Pfluger et al. | |
| 2021/0293598 A1 | 9/2021 | Mahalingam et al. | |

FOREIGN PATENT DOCUMENTS

| | | | |
|---|---|---|---|
| DE | 10 2017 131269 A1 | 6/2019 | |
| EP | 1431719 A1 | 6/2004 | |
| EP | 2464949 B1 | 6/2013 | |
| EP | 3 421 950 A1 | 1/2019 | |
| GB | 2 572 836 A | 10/2019 | |
| GB | 2581745 * | 8/2020 | G01F 1/84 |
| JP | H09-196730 A | 7/1997 | |
| JP | 5757474 B2 | 7/2015 | |
| WO | WO-2011/018098 A1 | 2/2011 | |
| WO | WO-2019/134430 A1 | 7/2019 | |
| WO | WO-2021/186232 A1 | 9/2021 | |
| WO | WO-2021/214534 A1 | 10/2021 | |

OTHER PUBLICATIONS

Written Opinion for PCT/IB2020/057116, 6 pages (dated Jan. 20, 2021).

International Search Report for PCT/IB2020/056587, 4 pages (dated Nov. 27, 2020).

Written Opinion for PCT/IB2020/056587, 10 pages (dated Nov. 27, 2020).

* cited by examiner

SYSTEMS AND METHODS FOR FLUID FLOW MEASUREMENT WITH MASS FLOW AND ELECTRICAL PERMITTIVITY SENSORS

TECHNICAL FIELD

This specification describes examples of systems and methods usable for flow-related measurements in fluid conduits.

BACKGROUND

Flow measurement is generally the quantification of bulk fluid movement, for example, in or through a conduit or pipe. Flow can be measured using a number of different techniques. Example flowmeters include pressure based meters, for example, orifice plate meters or Pitot tubes, mechanical meters, for example, based on fluid flow around a turbine or paddle wheel, and Laser-based methods based on the Doppler Effect observed in moving fluids. Which flow measurement technique is used may be determined by the application and environmental conditions.

SUMMARY

An example system is configured for determining properties of a fluid in a conduit. The system includes a mass flow meter including a hollow conduit having an inlet, an outlet, and a wall. The conduit is for conducting the fluid. The system includes a driver coupled to the conduit. The driver is configured for inducing an oscillation in the conduit. The system includes two or more accelerometers coupled to the conduit. The two or more accelerometers are configured for measuring displacement of the conduit. The system includes an electrical permittivity sensor coupled to the conduit. The electrical permittivity sensor is configured for measuring electrical permittivity of the fluid.

The conduit may be made of an electrically non-conductive material. The conduit may include a material with a density of between 1,000 and 2,000 kg/m$^3$.

The electrical permittivity sensor may include two or more sensor patches embedded within the wall of the hollow conduit. The electrical permittivity sensor may include two or more sensor patches disposed on an outer wall of the hollow conduit. The electrical permittivity sensor may include two or more sensor patches disposed on an inner wall of the hollow conduit. The electrical permittivity sensor may include a sensor patch on the hollow conduit and a sensor patch mounted on a mount at a distance from the conduit. The electrical permittivity sensor may include two sensor patches disposed on the hollow conduit, the two sensor patches arranged on diametrically opposing surfaces along a circumference of the hollow conduit.

The conduit may in include two tubes arranged in parallel along a length of the conduit. The system may include a differential pressure sensor mounted on the conduit adjacent to the inlet and a differential pressure sensor mounted on the conduit adjacent to the outlet.

An example method is for determining properties of a fluid in a conduit. The method includes flowing the fluid through a mass flow meter including a hollow conduit having an inlet, an outlet, and a wall. The conduit is for conducting the fluid. The method includes inducing an oscillation in the conduit using a driver coupled to the conduit. The method includes measuring displacement of the conduit using two or more accelerometers coupled to the conduit. The method includes measuring electrical permittivity of the fluid using an electrical permittivity sensor coupled to the conduit. The method includes receiving, by a processor, sensor data from the sensor. The method includes determining, by the processor, from the sensor data, a property of the fluid.

The conduit may be made of an electrically non-conductive material. The conduit may include a material with a density of between 1,000 and 2,000 kg/m$^3$.

The electrical permittivity sensor may include two or more sensor patches embedded within the wall of the hollow conduit. The electrical permittivity sensor may include two or more sensor patches disposed on an outer wall of the hollow conduit. The electrical permittivity sensor may include two or more sensor patches disposed on an inner wall of the hollow conduit. The electrical permittivity sensor may include a sensor patch on the hollow conduit and a sensor patch mounted on a mount at a distance from the conduit. The electrical permittivity sensor may include two sensor patches disposed on the hollow conduit, the two sensor patches arranged on diametrically opposing surfaces along a circumference of the hollow conduit.

The conduit may in include two tubes arranged in parallel along a length of the conduit. The method may include measuring a differential pressure in the fluid using a differential pressure sensor mounted on the conduit adjacent to the inlet and a differential pressure sensor mounted on the conduit adjacent to the outlet.

Any two or more of the features described in this specification, including in this summary section, may be combined to form implementations not specifically described in this specification.

At least part of the processes and systems described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DETAILED DESCRIPTION

Figure 1:
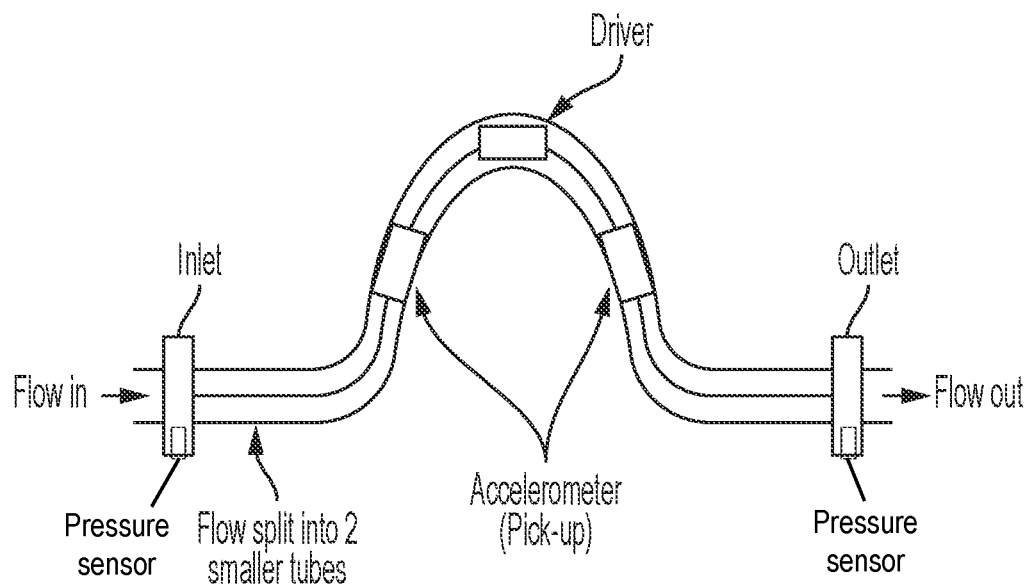
FIG. 1 is a schematic longitudinal cross-section of an example U-shaped conduit including a driver and two accelerometers as described in this specification.

Fluid flow measurements in conduits, for example, in pipes or other tubing, are often performed using a dedicated flow meter that is inserted physically into a fluid conduit. A flow meter typically has flanges at either end to connect the flow meter to the conduit. The conduit may be modified to have matching flanges to accommodate the flow meter into the conduit. The fluid then passes through the flow meter where the rate of flow and/or compositions of the fluids may be measured. These types of flow meters often have a preferred pipe orientation, for example, vertical orientation or a horizontal orientation. These meters may also have certain requirements regarding their use or installation on the pipe. In some examples, these requirements may include requirements that the fluid flow pass through a straight section of pipe for a certain length that is a multiple of the diameter of the pipe, either before or after the flow meter, or both.

When a fluid is a mixture of multiple fluids, for example, a mixture of one or more of oil, water, gas, and solids (usually called multiphase fluid), the requirements imposed on the type or installation of flow meters may be even more extensive. For example, it may be necessary that the multiphase flow meter be installed immediately after a blind T-junction in the pipe with the flow meter installed in the section with the flow going vertically upwards immediately downstream of the T-junction. These specific requirements may ensure that a (multiphase) fluid is fully mixed or is homogenous because incomplete mixing or presence of heterogeneous fluids may cause errors in the measured flow rate. Some meters (for example, mechanical meters, for example meters including a turbine or other moving part immersed in the fluid) intrude in the fluid flow path, potentially causing a permanent pressure drop in the fluid flow, which needs to be compensated in the design of the entire system. At the very least, strict conditions on fluid entry and exit of into and out of the meter may need to imposed. In some cases, when the composition of the fluid or flow rate in the conduit changes, a conventional flow meter (for example, a mechanical meter) may become unusable because the meter is out of its specified range of operation. This means that the meter may have to be replaced causing disruption in the fluid conduit.

The calibration of existing flow meters may need to be adapted with changing compositions or fractions of different components in the fluid and flow velocities. For example, in the oil and gas industry, a fluid may be a composition of hydrocarbons, water, solids, semi-solids (for example, mud), and gas. Moreover, these components may not be distributed homogeneously across or along a length of conduit through which the fluid is pumped. For example, a gas (phase) may flow faster than a liquid (phase). This may lead to inaccurate flow measurements, for example, measurements of bulk mass flow or density.

Thus, while a meter may function well within its design range at the time of the installation, the flow may shift outside the measurement range of the flow meter, for example, if composition of pumped fluid changes after installation. In such cases, the calibration of the flowmeter has to be repeated and the meter reconfigured. This reconfiguration may be accomplished by a software update. In some cases, however, the flow meter may have to be replaced with a different meter. Replacement is associated with the installation difficulties and with expensive commissioning and wiring.

This specification describes a measurement system that integrates an electromagnetic permittivity measurement system into a Coriolis-type flow meter. The flow meter may be used to determine fluid flow parameters and relative composition of the fluid. One or more components of the flow meter may be made of non-metallic pipe materials. An advantage of this system is that the density measurement may provide contrast between gas and liquids while the electrical permittivity measurement may provide contrast between hydrocarbons and non-hydrocarbon materials. Simultaneous electrical permittivity measurements of a volume of fluid in a Coriolis-type flow meter in combination with inertial response information from the meter may be used to characterize fluid and flow properties including mass flow rate, density, water cut, gas fraction, and viscosity.

Generally, when a fluid (for example, a gas or liquid, or a mixture of one or more of a gas, a fluid, and a solid) passes through a conduit that is being accelerated (mechanically excited) in a direction that is not parallel to the axis of flow, the contents of the conduit experience a Coriolis force. The Coriolis force is an inertial force that is perpendicular to both the axis of the centrifugal acceleration and the axis parallel to the direction of flow. The magnitude of the Coriolis force depends on the mass flow rate of the contents of the conduit. An effect of the Coriolis force is to cause a twist of or in the conduit in addition to bending caused by the mechanical excitation. This twist in turn causes a time delay between the applied mechanical excitation and the response of the contents of the conduit to this excitation. The time delay measured between two points along the direction of flow in a section of the conduit may be used to calculate the mass flow rate of the contents of that section of the conduit. In the frequency domain, the time delay translates to a phase shift between the measured waveforms of displacement (or force) between the two points in the conduit.

This specification describes an example flow measurement system based on the Coriolis mass flow measuring principle that maybe capable of or configured to measuring distributed density of the fluid within a given (radial) cross-section or length of the pipe, or the fluid flow rate along a length of the pipe, or both. In sum, Coriolis meters use the resonant frequency of curved or bent tubes to measure the density of the fluid within the pipe. A strain/displacement response of a fluid filled conduit to a mechanical excitation, for example, vibration, depends on the properties of the fluid (for example, density, viscosity, ratio of liquid, gas, or solid phases) or the mass flow rate of the fluids, or a combination of fluid properties and mass flow rate. In conduits filled with a mixture of two or more fluids, the strain/displacement response of a conduit depends on the properties of the mixture of fluids, for example, on the proportion of different fluids within the conduit. For example, a mixture of water and oil is likely to have a higher density compared a mixture of water and gas. One or more of strain, displacement, velocity, and load across or along a length of conduit may be measured, for example, using a one or more strain, displacement, velocity or load sensors that may be installed in predefined locations on the conduit. As used in this specification, velocity may refer to the speed at which a point in the conduit or tube is moving with respect to a reference position (for example, when the conduit is empty and is not vibrated). Displacement and acceleration may also be measured with respect to the same reference. In some implementations, displacement may be visualized as the motion of a pendulum swinging about a reference point.

This specification describes an example flow measurement system that may be used to determine one or more properties of a fluid in a conduit, for example, a fluid flowing through the conduit. An example system may be or include a Coriolis-type mass flow meter. An example system may include one or more hollow conduits. An example system may include one or more drivers coupled to the conduit. The one or more drivers are for inducing one or more types of motion in the conduit, for example, vibration or oscillation. An example system may include one or more accelerometers coupled to the conduit. The accelerometers may be used to measure displacement of a section of the conduit in one or more directions. An example system may include one or more electrical permittivity sensors coupled to the conduit. The electrical permittivity sensors may be used to measure electrical permittivity of the fluid inside the conduit.

The technologies described in this specification may be used to examine the properties of a variety of fluids. In some implementations, a fluid may be a single-phase fluid. In some implementations, a fluid may be a multiphase-fluid. Example fluids may include one or more hydrocarbons. Example fluids include oil (for example, crude oil), water, or a mixture of oil and water. Example fluids may include a gas. Example fluids may include a gas-liquid mixture, for example, a mixture including oil and natural gas, or a mixture including oil and water vapor (steam). Example fluids may include a liquid-solid mixture, for example, a mixture of oil and mud, for example, water-based drilling mud. Drilling mud may include solid particles, for example, rock cutting fragments.

An example fluid to be measured with the technologies described in this specification may have a density of between about 1 and 5,000 kilograms per cubic meter ($kg/m^3$), between about 1 and 3,000 $kg/m^3$; between about 1 and 2,000 $kg/m^3$; between about 800 and 5,000 $kg/m^3$; between about 800 and 3,000 $kg/m^3$; between about 800 and 2,000 $kg/m^3$; between about 1,200 and 5,000 $kg/m^3$; between about 1,200 and 3,000 $kg/m^3$; between about 1,200 and 2,000 $kg/m^3$. In some implementations, a fluid may be or include hydrocarbon and non-hydrocarbon liquids that may have a density in the range of 850-1,200 $kg/m^3$. A fluid may be inhomogeneous. Thus, the density of a fluid may vary across a (radial) cross-section of the conduit, or may vary along a length of the conduit, or both.

An example fluid to be measured with the technologies described in this specification may have a dielectric constant. In some implementations, a fluid may be or include drilling mud having dielectric constant of between 5 and 10. In some implementations, a fluid may be or include salt water that may have a dielectric constant of about 70-80 at room temperature. In some implementations, a fluid may be or include one or more hydrocarbons having a dielectric constant of between 1 and 3.

An example system as described in this specification may include one or more hollow conduits. A conduit to be used with the technologies described in this specification may be or include one or more pipes. Each pipe includes a wall, for example, a wall forming a lumen. The wall may form a cylindrical lumen or a lumen having an oval, square, rectangular, or other cross-section. In some implementations, a conduit may include a single pipe. In some implementations, a conduit may include two or more pipes arranged in parallel or in a stacked configuration (for example, two concentric U-bends) such that fluid flow entering the conduit may be split into two or more flows. Generally, splitting fluid flow into two (symmetrical, parallel, or concentric) pipes has at least two benefits. First, the diameter for individual pipe is smaller than the main fluid conduit, which renders the pipes more flexible and easier to vibrate with less energy. Second, the signals (for example, velocity signals) are received from two pipes whereby the data from one pipe may be subtracted from the data from other pipe, which may remove some or almost all noise from the data (assuming the fluid content in each pipe is the same, which is mostly true in single-phase fluid flows, and assuming that the two pipes are exactly of same construction). In signal processing, this is known as common-mode signal rejection.

Pipes in Coriolis meters are typically made from metals, such as steel. The maximum displacement of a pipe during actuation (for example, vibration) as measured from a stationary reference position is usually under 1 mm and rarely over 5 mm. The time lag between the entry and exit displacement/velocity sensors (used to measure mass flow) is typically 1-1000 microseconds and rarely above 10000 microseconds. In addition, external noise may be present in the order of frequencies that pipes in Coriolis meters are vibrated (for example, 50-1000 Hz). Noise may be present particularly in gas flows, which dampen the noise less than liquid flows. Thus, measurements (displacement, velocity or acceleration) have to be highly accurate and fast. In some implementations of a system as described in this specification, a pipe may be made of a non-metallic material or a material with a lower density than steel. A pipe made of such a material may be more flexible and/or require less energy for actuation or may be used to induce greater displacement than a steel pipe, which may render the system safer to operate and more accurate.

A conduit includes a fluid inlet and a fluid outlet. A conduit may have a length between the inlet and outlet. The length of conduit may be substantially straight or may be curved, or may include a curved section. In some implementations. a section of the length of conduit may be L-shaped, U-shaped, V-shaped. In an example implementation, a section of the length of conduit may be U-shaped, the section including two legs forming a "U" and an apex. In an example implementation, a section of the length of conduit may be V-shaped, the section including two legs forming a "V" and an apex.

A conduit may be or include one or more pipes that include or are made of a material with a density of less than 8,000 $kg/m^3$. Typical Coriolis meters are made out of steel alloys that have a density of about 7800 $kg/m^3$. An example material that may be used with the system described in this specification may have a density of between 700 and 5,000 $kg/m^3$, between 800 and 3,000 $kg/m^3$, between 850 and 2,000 $kg/m^3$, or between 900 and 1,500 $kg/m^3$. In some implementations, an example material may be electrically conductive. In some implementations, an example material may not be electrically conductive. In some implementations, a conduit may include a pipe section that is made of a material with a density that is less than 200% of the density of an oil and water mixture and that is not electrically conductive. In some implementations, a conduit may include a pipe section that is made of a material with a density that is less than 2,000 $kg/m^3$ and that is not electrically conductive. In some implementations, a material may be or include a polymer. In some implementations, one or more elements of the system, for example, one or more accelerometers or sensors may be embedded in the wall of the conduit.

An example system as described in this specification may include one or more drivers coupled to the conduit to induce motion in the conduit. Example motion induced in a length of conduit between the inlet and outlet may include vibration or oscillation. In some implementations, an example driver may be or include a mechanical vibrator. In some example implementations, a mechanical vibrator may include a motor rotating a shaft with an eccentrically placed element or non-circular element (for example, an oval or teardrop shaped element) mounted on the shaft. The element may be in contact with the length of conduit, for example, at or near the apex or a U- or V-shaped length of conduit (FIG. 1). Rotation of the element induces movement in the length of conduit, for example, movement in a direction perpendicular to the plane of the U- or V-shape. Movement of each of the legs of the V-shaped length of conduit may vary depending on, for example, flow rate, density, or density distribution (or a combination of flow rate, density, or density distribution) (Coriolis effect). In some implementations, other types of drivers may be used, for example, electromagnetic, hydraulic, or pneumatic drivers may be used.

An example system as described in this specification may include one or more accelerometers coupled to the conduit. The accelerometers may be used to measure displacement of in a length of the conduit in one or more directions movement in a direction perpendicular to the plane of the U- or V-shape. In some implementations, an example accelerometer may include an electromagnetic induction device, where a moving metallic element is connected to the length of conduit, for example, a leg of a U- or V-shaped length. The example accelerometer may include an electromagnet disposed in the system such that movement of the metallic element induces an electric current in the electromagnet ("pick-up" configuration). The electric current may be measured and movement of the metallic element (and thus of a section of length of conduit) may be calculated. In some implementations, an accelerometer may include an optical element (for example, a laser, a mirror, and a photodetector) or a mechanical element or electromechanical element (for example, a strain gauge) to detect and quantify displacement of one or more arms. From the measurements obtained from the accelerometers, fluid properties, for example, mass flow and density, may be calculated.

An example system as described in this specification may include one or more sensors to provide additional measurements, for example, in order to characterize the fluid or to compensate for artifacts or inaccuracies in the data derived from the accelerometers. These artifacts or inaccuracies may be caused by heterogeneity of multiphase fluids, for example, the presence of solids dispersed in liquid or presence of a gas phase in a liquid phase. The selection of these additional measurements may be used for (further) improving the accuracy of the system. In some implementations, the one or more sensors may measure the same physical quantity as the accelerometer derived quantity (for example, flow rate or density) using a different method. In some instances, however, the heterogeneous flow regimes and patterns across the conduit may cause errors in density measurement, and slip between a liquid and a gas phase in high gas volume fractions may causes errors in mass flow measurement.

An example system may include one or more sensors, for example, one or more electrical permittivity sensors coupled to the conduit. In some implementations, the electrical permittivity sensors may be used to measure electrical permittivity of the fluid inside the conduit.

The contrast in density between gas and liquid typically varies from 1:1000 to 1:10 and hence a density measurements may be used to account for presence of gas in a liquid flow meter or vice versa. In comparison, the contrast in density between oil and water is lower (for example, the density of oil may be about 850 kg/m$^3$ for oil and the density of water may be about 1,000 kg/m$^3$) and hence the presence of water dispersed in oil (or vice versa) may be not be accurately determined based on density measurements alone. Described in this specification are systems and methods for measurement of complex electrical permittivity that may be integrated into a Coriolis-type flow meter. The relative permittivity of water is between about 70 and about 90, for example, about 80. The relative permittivity of oil is between about 2 and about 3, for example, about 2.3. The relative permittivity of gas is about 1. Measurement of relative electrical permittivity in a fluid may show significant contrast between hydrocarbons and water. When combined with the density measurement from the Coriolis meter, measurement of permittivity may offer a complete solution to for quantitative and qualitative assessment of flow of multiphase fluids. In some implementations, permittivity of a fluid may be determined by measuring complex dielectric properties, for example, capacitance, across a volume of fluid. Capacitance is proportionally related to permittivity and may be measured directly. Analogous to the plates of a capacitor, one or more electrically conducting patches (permittivity patches) may be attached or integrated into a conduit. An electrical permittivity patch is connected to electronics that will produce a series of electromagnetic signals with the fluid acting as a dielectric medium between the conductors (permittivity patches), in series with the sensing circuit. The change in complex dielectric properties, for example, capacitance, is measured in the circuit, for example, by charging and discharging the permittivity patches with a known current and measuring the rate of rise of the resulting voltage. Using, for example, calibration models or curves, a proportion of water in the mixture of fluids may be inferred from the measurements. The measurements, for example, dielectric spectroscopy, may be performed over a wide range of frequencies, for example, from 50 kiloHertz (kHz) to 3 GigaHertz (GHz). In some implementations, measurements at lower frequencies (for example, less than 100 MegaHertz (MHz)) the technique may be referred to as capacitance measurement. In some implementations, measurement at higher frequencies (for example, greater than 100 MHz), the technique may be referred to as microwave spectroscopy.

In some implementations, an example model may include two steps. The first step includes correlating the measured dielectric properties, for example, capacitance and the dielectric constant of the material between permittivity patches. In some implementations the material between permittivity patches includes fluid. In some implementations the material between permittivity patches includes fluid and conduit material. The second step includes converting the dielectric constant into a hydrocarbon fraction. The conversion may include use of a mixture model, for example, the Bruggemann model (see Bruggeman, D.A.G. . . . Berechnung Vershiedener Physikalischer Konstanten Von Heterogenen Substanzen. Ann. Phys. 24 (1934)). In some implementations, other models, for example, the Hanai-model, may be applied (see Hanai, T., Bulletin of the Institute for Chemical Research, Kyoto University (1962), 39(6), 341-367.) Each model carries an assumption of the size, shape, and distribution of the hydrocarbon and non-hydrocarbon particles within a conduit. In some implementations, dielectric properties, for example, capacitance may not be measured directly. Instead, the resonant frequency of a circuit including the fluid is measured. In such cases, the model may include a third step of converting the measured resonant frequency to the dielectric properties, for example, capacitance of the fluid.

Figure 2:
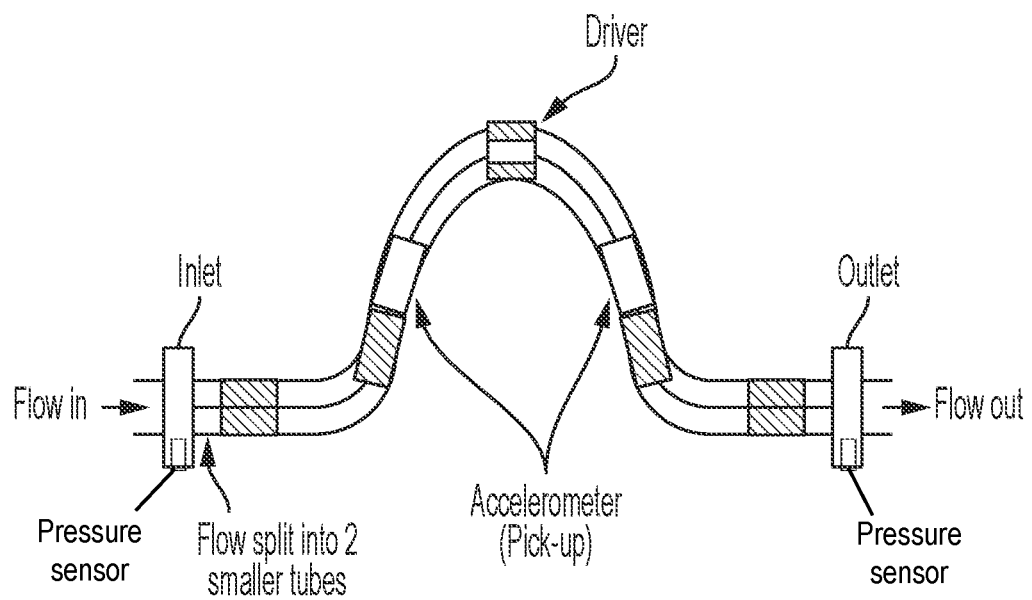
FIG. 2 is a schematic longitudinal cross-section of an example U-shaped conduit including a driver, two accelerometers, and five permittivity patches as described in this specification.

An example configuration of a system including a plurality of permittivity patches in shown in FIG. 2. In an example configuration, one patch or set of patches is disposed at or near a fluid inlet, and one patch or set of patches may be disposed at or near a fluid outlet. Differences between the permittivity measured between inlet patch (or set of patches) and outlet patch (or set of patches) maybe use to determine fluid composition or other properties. Additional patches, or sets of patches) may be included in the system, for example, at or near an apex of a V-shaped conduit. The electrical permittivity measurement between the two patches can be correlated to measure the slip velocity of the gas. In some implementations, where the conduit includes two parallel pipes, a permittivity patch can also be used at an outlet of the conduit where the flow the two pipes mixes back together. This configuration may result in complete mixing of the flow and measurement of the homogenous permittivity of the mixture may provide (additional) data that may reduce overall error in the system.

Figure 3:
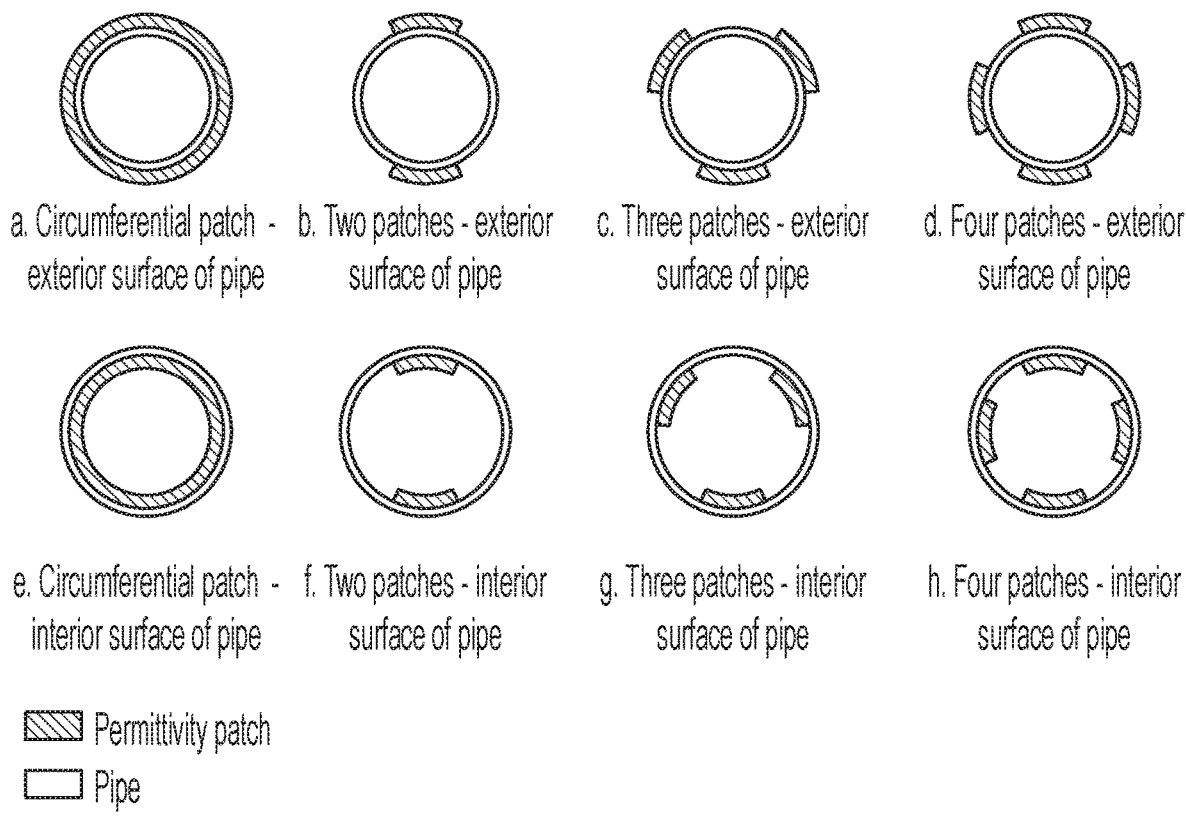
FIGS. 3a-3h are schematic radial cross-sections of a conduit including one or more permittivity patches.

Permittivity patches may be disposed in, on, or around a conduit in various configurations as shown in FIG. 3. In a first configuration, a patch or set of patches may be arranged (for example, attached) to an external surface of a conduit or pipe, for example, as shown in FIG. 3a-3d. In some implementations, a patch or set of patches may be integrated into a wall of a conduit or pipe. In a second configuration, a patch or set of patches may be arranged (for example, attached) to an internal surface of a conduit or pipe, for example, as shown in FIG. 3e-3h).

In some implementations, a permittivity patch is a single patch, for example, a circumferential patch as shown in FIGS. 3a and 3e. In this implementation, a measurement is performed between the patch mounted on the conduit and a second patch mounted on a surface external to the conduit, for example, the ground. The patch may act like an antenna that transmits an electromagnetic signal into the fluid. The reflection of the signal from the patch back to the external patch (ground) may be used as a measure of the dielectric constant/dielectric properties (for example, capacitance) of the fluid. In some implementations, two or more single patches may be disposed along the length of the conduit or pipe. A first single patch may acts as the signal patch and a second patch may act as the ground. In this implementation, the transmission of the signal between the two patches is affected by the dielectric constant or dielectric properties, for example, capacitance of the fluid.

In some implementations, a set of permittivity patches may include two (FIGS. 3b and 3f), three (FIGS. 3c and 3g), four (FIGS. 3d and 3h), or more patches. In an example implementation, the permittivity measurement is performed between the two patches (FIGS. 3b and 3f). A first patch of the set of patches may act as signal and the second patch of a set of patches may act as ground.

In some implementations, a conduit or pipe used with the system described in this specification is at least in part made of a non-metallic or electrically non-conducting material. A metallic or conducting conduit or pipe may provide a short path to ground, may interfere with the transmission of electromagnetic signals within the fluid, and may ground a signal before the signal can flow through the desired path (the fluid). A non-metallic or non-conducting material may include a polymer, a ceramic, glass, or a composite material. In some implementations, a conduit or pipe may include a non-conducting metal. In some implementations, a conduit or pipe may include a composite material including metallic and ceramic or polymeric materials capable of resisting the temperature, pressure, and chemical properties of a fluid within the conduit or pipe, for example, crude oil or drilling fluids. The conduit or pipe are part of the electromagnetic circuit and a calibration or calculation model includes the dielectric constant of the conduit or pipe. In some implementations, permittivity patch may be mounted on an external surface of a conduit or pipe. In this case, the effect of the (full thickness) of the conduit or pipe material may be more pronounced than in configurations where the permittivity patch is embedded or integrated into a conduit or pipe wall. A permittivity patch may be integrated into a conduit or pipe wall using various techniques or configuration. In some implementations, a non-metallic conduit or pipe may be built in layers, for example, using fabric weaving techniques, injection molding, or 3D printing. Permittivity patches and associated electronics may be built into the pipe like printed circuit board components.

A measurement configuration using one or more permittivity patches may depend on the material of the pipe. Generally, a conduit or pipe material may be electrically conductive or insulating. In case of a metallic (conductive) conduit or pipe, an electromagnetic patch sensor may require electrical insulation between the signal and the conduit or pipe material. Like the conduit or pipe, a fluid may be electrically conductive (for example, a fluid with >50% saline water content) or electrically insulating (for example, oil or gas). The fluid may be represented as a resistor (related to conductivity or imaginary part of complex permittivity) and a capacitor (related to dielectric constant or real part of complex permittivity) in parallel. These two circuit elements compete to carry an applied electrical signal (as they are on parallel paths, the path offering less impedance will be preferred). In a highly conductive fluid, the signal is effectively shorted across the fluid, which means that little signal is carried through the capacitor part of the fluid. Therefore, measurement of the capacitance or the real part of permittivity is likely to be poor. In these circumstances it is advantageous to insulate the patch from the fluid. In cases, however, where the fluid is electrically insulating, a patch may not be insulated, for example, to avoid an (additional) electrical barrier that may attenuate signal and reduce accuracy. In some implementations, a system may include insulated (from the fluid) patches or non-insulated patches, or a combination of insulated and non-insulated patches. In some implementations, a system including insulated and non-insulated patches may be used for measurement of electrically conductive and electrically insulating fluids. An example electromagnetic patch sensor may be in direct electrical contact with the fluid, for example, by being mounted directly on a metallic conduit or pipe, or may be electrically insulated from the fluid, for example, by being mounted on an external surface of a non-metallic conduit or pipe. In case of a patch mounted directly on a metallic conduit or pipe, a permittivity patch would not be insulated from the fluid and be able to measure the imaginary part of the complex electrical permittivity that is related to the conductivity of the fluid. A separate insulator may be required between a patch and a pipe. In case of a patch mounted directly on a non-metallic conduit or pipe, however, would be insulated from the fluid and may be able to measure the real part of the complex electrical permittivity of the fluid.

Different flow regimes may result in different flow patters within a conduit or pipe. For example, in a bubbly flow regime, the gas bubbles may be uniformly distributed within a liquid phase and the bubbles may travel almost the same velocity as the liquid. In a slug flow regime, a (long) stream of gas may travel close the center of the conduit or pipe at higher velocity than the surrounding liquid. In addition to the errors caused by the presence of multiple materials or phases in the flow, the distribution of them may cause measurement errors. In order to estimate distribution of (multiphase) material, an electrical permittivity patch may include or may be subdivided into at least three parts arranged circumferentially around a conduit or pipe (FIGS. 3c, d, g, h). Multiple measurements may be made between pairs of patches resulting in measurements along different axes in the same radially cross-sectional plane of the conduit or pipe. A cross-section of conduit or pipe may thus be split into sectors. These measurements may be used for identifying gas within the conduit or pipe by analyzing the electrical permittivity between the patches and hence quantifying amount or spatial distribution of a gas volume within the cross-section of the conduit or pipe (or each sector of conduit or pipe). Unlike X-rays or light, electromagnetic fields of the type used in this implementation do not travel in straight lines. Instead, these fields take the path of least resistance. In circumstances where a more conductive fluid is available within a conduit or pipe (for example, saline water), the electromagnetic field lines will follow the shorter path.

In some implementations, rather than integrating a non-metallic pipe containing the electromagnetic permittivity patch into a Coriolis-type flow meter, the Coriolis-type flow meter system may be made of a non-metallic (or non-conducting) material. A non-metallic or non-conducting material to be used for this system may include a polymer, a ceramic, glass, or a composite material. In some implementations, a system may include a non-conducting metal. In some implementations, a system may include a composite material including metallic and ceramic or polymeric materials capable of resisting the temperature, pressure, and chemical properties of a fluid within the conduit or pipe, for example, crude oil or drilling fluids.

In an example implementation of the system, the system may be customized. For example, the geometry of the conduit may be customized. For example, an existing fluid system may include a flanged section of a metallic pipe that is a part of a flow line. This section may be straight or have a U- or an L-shaped joint. In some implementations, that flanged section may be replaced with an equivalent non-metallic section with embedded patches for measurement of dielectric properties, for example, capacitance and Coriolis measurement implements (driver and accelerometer) for mass flow measurement. In this case, the flow path may not be divided into two tubes (for example, like in a conventional Coriolis meter) and may consist of just a single path.

The natural resonant frequency of an L-shape or a U-shape pipe is given, for example, in Blevins, Robert D. "Formulas for Natural Frequency and Mode Shape", (New York: Van Nostrand Reinhold Co., 1979, pages 215-16). From the formula for the natural frequency, it can be seen that the resonant frequency is inversely proportional to the square root of the mass per unit length of the conduit or pipe, which includes the conduit or pipe and the mass of the fluids flowing within the conduit or pipe. Coriolis meters are typically shaped like a U-bend or have a shape similar to a U-bend. Coriolis meters are calibrated to measure the shift in resonant frequency between an empty meter and a meter at least partially filled with a (flowing) fluid. The shift in resonant frequency in a meter made of steel is a few 10s of Hertz (Hz). For example, the meter may have a resonant frequency of about 350 Hz and this may shift by 20-50 Hz if the meter is full of a liquid with a density 1000 kg/m$^3$. If the tube is filled with gas that has a density of less than 100 kg/m$^3$, the shift is significantly smaller.

An advantage of a Coriolis-type flow meter with conduit or pipe made of a non-metallic material is that non-metallic materials (for example, polymers) have a significantly lower density and hence lower mass per unit length. For example, carbon fiber or graphite reinforced polymers have a density of about 1800 kg/m$^3$, which is comparable to the density of hydrocarbon and non-hydrocarbon materials flowing through the pipe. This similarity in density may make such a Coriolis-type flow meter more sensitive to the effects of the fluid properties and may reduce the requirements for sensitivity of the measurement components, for example, the accelerometers. Moreover, the energy or power necessary to actuate a conduit or pipe made from a non-metallic material may be (significantly) less than the energy of power necessary to actuate a metallic conduit or pipe, which may increase safety or accuracy of measurement.

In some implementations, a system as described in this specification may include one or more additional sensors. In some implementations, a system may include two pressure sensors in or on a conduit or pipe, for example, one at the inlet end and one the outlet end. A pressure sensor may be a wetted strain gauge/piezo/quartz pressure transducer that is connected to the fluid via a mechanical connection. The pressure sensor may be a non-contact (not wetted by the fluid) sensor, such as a strain measurement device attached on an outer wall of the conduit or pipe. The volume occupied by a gas is a function of the pressure. Pressure measurements (for example, measurements taken simultaneously with other flow or permittivity measurements) may be used to account for any change in density of the gas due to pressure. In some implementations, a differential pressure sensor may be used to measure the pressure drop along a length or across a conduit or pipe. The differential pressure sensor may be wetted by the fluid or may be a non-contact sensor. The pressure difference between the inlet and outlet of a system or meter may also provide information on the effective density or the viscosity of the fluid.

In some example implementations, a system as described in this specification may be controlled using on or more processors of a control unit. In some implementations, a control unit may be (pre)programmed to control one or more drivers, for example, to induce a specific set of vibration patterns. In some implementation, a control unit may (pre) programmed to receive data from one or more accelerometers or one or more permittivity patches. A control unit may store or execute one or more executable files for calculation of one or more fluid parameters.

At least part of the system described in this specification and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A system for determining properties of a fluid in a conduit, the system comprising:
    a mass flow meter comprising a hollow conduit having an inlet, an outlet, and a wall, the conduit for conducting the fluid, a driver coupled to the conduit for inducing an oscillation in the conduit, and two or more accelerometers coupled to the conduit to measure displacement of the conduit; and
    an electrical permittivity sensor coupled to the conduit to measure electrical permittivity of the fluid,
    where the electrical permittivity sensor comprises two or more sensor patches.

2. The system of claim 1, where the conduit is made of an electrically non-conductive material.

3. The system of claim 1, where the conduit comprises material with a density of between 1,000 and 2,000 kg/m$^3$.

4. The system of claim 1, where the two or more sensor patches are embedded within the wall of the hollow conduit.

5. The system of claim 1, where the two or more sensor patches are disposed on an outer wall of the hollow conduit.

6. The system of claim 1, where the two or more sensor patches are disposed on an inner wall of the hollow conduit.

7. The system of claim 1, where the two or more sensor patches are disposed on the hollow conduit arranged on diametrically opposing surfaces along a circumference of the hollow conduit.

8. The system of claim 1, where the conduit comprises two tubes arranged in parallel along a length of the conduit.

9. The system of claim 1, comprising a differential pressure sensor mounted on the conduit adjacent to the inlet and a differential pressure sensor mounted on the conduit adjacent to the outlet.

10. A method for determining properties of a fluid in a conduit, the method comprising:
    flowing the fluid through a mass flow meter comprising a hollow conduit having an inlet, an outlet, and a wall, the conduit for conducting the fluid,
    inducing, by a driver coupled to the conduit, an oscillation in the conduit,
    measuring, by two or more accelerometers coupled to the conduit, displacement of the conduit;
    measuring, by an electrical permittivity sensor coupled to the conduit, electrical permittivity of the fluid;
    receiving, by a processor, sensor data from the sensor; and
    determining, by the processor, from the sensor data, a property of the fluid,
    where the electrical permittivity sensor comprises two or more sensor patches, the two or more sensor patches being at least one of (1) embedded within the wall of the hollow conduit, (2) disposed on an outer wall of the hollow conduit, (3) disposed on an inner wall of the hollow conduit, and (4) mounted on a mount at a distance from the conduit.

11. The method of claim 10, where the conduit is made of an electrically non-conductive material.

12. The method of claim 10, where the conduit comprises material with a density of between 1,000 and 2,000 kg/m$_3$.

13. The method of claim 10, where the two or more sensor patches are disposed on the hollow conduit arranged on diametrically opposing surfaces along a circumference of the hollow conduit.

14. The method of claim 10, where the conduit comprises two tubes arranged in parallel along a length of the conduit.

15. The method of claim 10, comprising measuring, by a differential pressure sensor mounted on the conduit adjacent to the inlet and a differential pressure sensor mounted on the conduit adjacent to the outlet, a differential pressure in the fluid.

16. A system for determining properties of a fluid in a conduit, the system comprising:
    a mass flow meter comprising a hollow conduit having an inlet, an outlet, and a wall, the conduit for conducting the fluid, a driver coupled to the conduit for inducing an oscillation in the conduit, and two or more accelerometers coupled to the conduit to measure displacement of the conduit; and
    an electrical permittivity sensor coupled to the conduit to measure electrical permittivity of the fluid,
    where the electrical permittivity sensor comprises a sensor patch on the hollow conduit and a sensor patch mounted on a mount at a distance from the conduit.

* * * * *